United States Patent [19]

Fennern

[11] Patent Number: 4,957,690
[45] Date of Patent: Sep. 18, 1990

[54] SYSTEM AND METHOD FOR MONITORING AND CONTROL OF SAFETY-RELATED COMPONENTS OF A NUCLEAR POWER PLANT

[75] Inventor: Larry E. Fennern, San Jose, Calif.

[73] Assignee: General Electric Company, San Jose, Calif.

[21] Appl. No.: 280,800

[22] Filed: Dec. 7, 1988

[51] Int. Cl.$^5$ ............................................... G21C 7/36
[52] U.S. Cl. ..................................... 376/216; 364/188; 364/492
[58] Field of Search ................. 376/215, 216; 364/138, 364/146, 188 X, 492 X, 551

[56] References Cited

U.S. PATENT DOCUMENTS

| | | | |
|---|---|---|---|
| 4,060,716 | 11/1977 | Pekrul | 364/576 |
| 4,285,769 | 8/1981 | Specker | 376/216 |
| 4,687,946 | 8/1987 | Jones | 290/40 R |
| 4,853,175 | 8/1989 | Book | 376/216 |

*Primary Examiner*—Donald P. Walsh
*Attorney, Agent, or Firm*—Robert R. Schroeder

[57] ABSTRACT

A safety qualified interface device is interposed between an operator manned control position having an operator interface and qualified safety system logic monitoring and control devices. This microprocessor driven interface incorporates a memory carrying a library collection of valid safety directives as well as valid parameter inputs and permissible parameter deviation ranges. Control or parameter requests are asserted by the operator from non-safety related but conveniently positioned interface devices at the control position which are treated as trial inputs which are matched at the interface with memory retained valid directives and parameters. Where a match between memory retained data and the trial input signals occurs, then the operator is apprised through a qualified safety related display and a corresponding acknowledgement is made to the interface. The interface then transmits either the directive or parameter request to the associated divisional safety related components for execution and/or retrieval.

22 Claims, 5 Drawing Sheets

SYSTEM AND METHOD FOR MONITORING AND CONTROL OF SAFETY-RELATED COMPONENTS OF A NUCLEAR POWER PLANT

BACKGROUND OF THE INVENTION

Nuclear power plants traditionally have been designed for achieving a safe and reliable performance through resort to a studied redundancy, particularly with respect to functions and supportive components employed during emergency conditions. Emergency procedures will include such operations as water injection into the reactor core to lower heat values, the classic "SCRAM" procedure wherein control rods are elevated to rapidly reduce power, and the like. Redundancy for the safety related systems is developed through designated divisions, usually associated with distinct reactor regions and supporting monitoring and control components. These latter components are physically separated as by fire and shock barriers and the like, as well as electrically isolated. Thus, each of the divisions will include such components as pumps, valves, monitors and automated controls which are powered from separate and distinct power supplies. The safety related system components or instruments used for these divisions generally must be qualified so as to meet rigorous criteria of nuclear regulatory agencies such as the Nuclear Regulatory Commission (NRC). Such criteria are centered about operational reliability, including performance under seismic phenomena. For example, the NRC requires an electrical classification designated as 1E for these components.

Electrical control isolation typically is developed by opto-coupling procedures, the more recent of which are derived from fiber optic forms of communication. Some forms of electrically isolated inter-divisional communication typically are provided for certain monitoring functions. Additionally, some non-divisional intercourse with divisional systems may be permitted. For example, conventional boiling water reactors (BWR) incorporate core traversing probes which are mechanically driven along a reactor core to provide neutron flux distribution data used for computing calibration constants employed, in turn, by fixed, divisionally located monitors.

In contrast to the safety related systems of nuclear power plants, controls and instrumentation used in conjunction with their normal or nominal course of operation are not provided with the degree of redundancy nor with the rigorous structuring required of safety related or divisional systems. Such controls look, for example, to feedwater regulation, certain mechanical systems, pressure controls, power monitoring, and the like. Unless the system is challenged or a failure occurs causing the automated safety related systems to carry out their designated procedures, the nominal or non-safety controls perform, in conjunction with a man-machine interface. The interface is structured as a relatively large console located within a control arena. Space requirements for such control rooms are quite extensive because of the additional presence of mandated safety related instrumentation, readouts and controls for each of the physically separated and electrically isolated divisions. These safety related implements generally account for about 40% of the overall control instrumentation. Typically, the large operator interfacing control console for normal operation is positioned somewhat centrally within the control room, while the panels carrying safety related instrumentation are remotely located, for example, along walls and the like.

To assure that error or fault is not propagated into the divisions or safety related systems from the man-machine interface, verification procedures have been instituted. For example, the earlier-discussed neutron monitor calibration constants are computed by a computer which is not a part of the qualified safety system. Thus, such computed data can be inserted into the divisions only following operator verification. Similarly, any permissible operator directive inputs to the divisions must undergo operator verification procedures involving the need for operator presence at various locations about the control room. The result has been a requirement for a large number of attending operators and space necessitated man-machine inefficiencies.

Because of the extensive spatial requirements for control rooms and of the operator inefficiencies necessitated by the large number of redundancy mandated instruments and controls, industry has sought to achieve a technique for concentrating necessary data at a singular man-machine interface location without compromising the necessary physical and electrical separation of divisions and the safety enhancement occasioned by verification procedures.

SUMMARY

The present invention is addressed to system, method and apparatus serving to facilitate the use of non-divisional, multi-purpose man-machine interfaces for accomplishing operator monitoring and manual control over dedicated, safety-related system devices of a nuclear power plant. This is accomplished by a technique wherein a divisional, electrically isolated, safety grade interface is provided between division safety-related system devices and the non-divisional man-machine interface. The employment of divisional interface within each division satisfies a basic requirement that credible failures within the non-divisional systems may not be propagated into nor prevent any portion of the safety-related system from satisfying all rigid safety performance criteria. As a consequence of such utilization of divisional interface techniques, an enhanced use of multi-purpose man-machine interface components such as touch screen systems or general purpose keyboards as a means for displaying system parameters and transmitting operator initiated control directives is achieved. Such enhanced employment of these man-machine communication and control components permits highly desirable control panel and control console area and volume reduction while improving ergonomic-human factor conditions to promote safe plant operations.

Under the procedure and with the apparatus of the invention, each divisional interface incorporates a microprocessor controlled memory which carries a library collection or compilation of valid safety directive inputs. The operator accesses the divisional interface from a central console to assert through an opto-isolated communications link a trial safety directive input which is positioned in an interface register or buffer, whereupon microprocessor logic carriers out a comparison or matching procedure of the test directive with respect to the memory contained valid directives. The selected memory contained valid directive then may be transmitted to the operator console for verification or acknowledgement, whereupon only the memory contained valid safety directive input is transmitted into the divisional safety system to carry out a safety procedure. Thus, a form of software isolation and verification is developed within each division of the power plant reactor. A corresponding procedure may be provided with respect to safety system status parameters, wherein, again the operator submits a trial safety system parameter designation through the isolated communications link to the divisional interface. The memory of the interface again contains a library compilation or collection of valid safety status parameters and the microprocessor functions to carry out a matching of the trial status parameter with the valid parameters retained in memory. On the occasion of a match, the valid parameter is employed for transmission into the safety system devices to retrieve parameter values for presentation to the operator at a display. The earlier-noted verification and acknowledgement procedures also may be employed with status parameter investigations and the divisional interface microprocessor also may carry out threshold or deviation procedures to develop alarms or warning signals for presentation to the operator and subsequent acknowledgment. In the latter regard, permissible deviations may be retained within the divisional interface memory for the latter function.

Other objects of the invention will, in part, be obvious and will, in part, appear hereinafter.

The invention, accordingly, comprises the system, apparatus, and method possessing the construction, combination of elements, arrangement of parts, and steps which are exemplified in the following disclosure.

For a fuller understanding of the nature and objects of the invention, reference should be had to the following detailed description taken in connection with the accompanying drawings.

DETAILED DESCRIPTION OF THE INVENTION

The system of invention functions to employ non-divisional, multi-purpose man-machine interfaces such as touch screen devices, general purposes keyboards and the like for accomplishing operator monitoring and manual control functions of safety system components. It achieves this by the provision of electrically isolated, safety grade interface devices between the touch screen systems and the divisionally positioned safety system logic and control networks.

Figure 1:
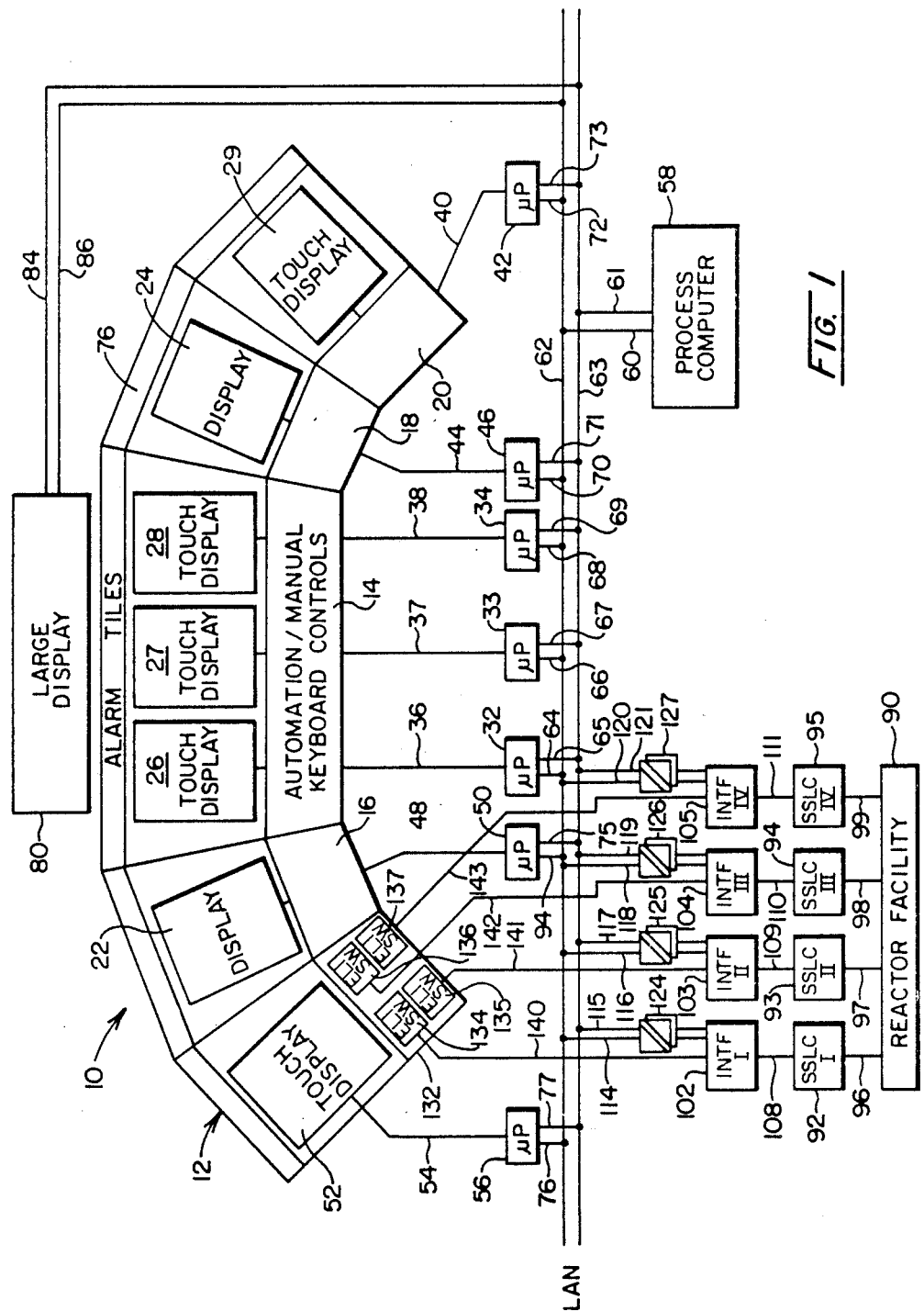
FIG. 1 is a schematic block diagram depicting an operator-manned control region, local area networking, safety system divisions, including interface apparatus and qualified safety systems logic for use in conjunction with a reactor driven power system.

Referring to FIG. 1, a schematic representation of an operator-manned control region is represented generally at 10. Within region 10 there is positioned, for example, a console 12 which will include man-machine interface controls for normal or nominal mode control over a reactor. Such controls will include manual as well as automated input devices as represented at blocks 14, 16, 18 and 20. Touch screen devices or displays may be employed with the nominal control system as represented at blocks 26-28, which function in conjunction with control block 14, while other display shown at blocks 22, 24, and 29 function in conjunction with control blocks 16, 18, and 20. In general, these normal operational mode controls are structured for microprocessor driven operation and this control relationship is represented in conjunction with control block 14 by microprocessor networks represented at blocks 32-34, the association thereof with block 14 being represented by respective lines 36-38. In similar fashion, the display 29 and control function 20 are shown performing in conjunction with microprocessor-based logic by line 40 and block 42; the control 18 and display 24 are shown performing with microprocessor logic by line 44 and block 46; and display 22 and control block 16 are shown performing with microprocessor logic by line 48 and block 50. Finally, a touch screen or display 52 is located at the end of the console 12 opposite display 29 and is seen to perform in conjunction with microprocessor-based logic as represented by line 54 and block 56. While not within a division or safety system, this display and interface 52 will be seen to provide a convenient location for operator activities associated with aspects of the safety system.

Microprocessor-based controls 32-34, 42, 46, 50, and 56 perform in conjunction with the processor computer system represented by block 58. This interactive control association is developed through a local area network (LAN) represented in the drawing by interconnected lines 60-77.

Additionally shown in the figure is a large panel display depicted by block 80 and shown operationally associated with the local area network by lines 84 and 86. This display is employed for providing wide area visual cuing for selected performance parameters of the system.

Under the system of the present invention, the operator performing in conjunction with the control region 10 maintains a capability for providing very select inputs to the safety system components from the non-safety system or non-class 1E components heretofore described. This is carried out through the provision of an interface device or apparatus within each of the divisions of the power system. Additionally, a small and class 1E qualified display and dedicated switching input is provided at console 12 adjacent to touch display 52.

In the figure, the reactor facility is represented at block 90 as being operationally addressed by individual qualified safety system and logic controls for divisions I-IV as represented by blocks 92-95 and respective lines 96-99. Each of these controls 92-95 is isolated, usually will be provided with dedicated separate power supplies, and serves to control and evolve logic with respect to particular divisional aspects of safety control. In accordance with the instant invention, the operator performing within the manual control region 10 is capable of asserting certain directives to the safety system logic control functions 92-95 while the important divisional autonomy is maintained. This is achieved by the interposition of a qualified, class 1E interface apparatus between the non-safety control components of region 10 and the logic and control divisional components 92–95. The interface devices are represented in the drawing at blocks 102–105 corresponding with the noted division designations I–IV. Safety qualified communications links between interface components 102–105 and the safety system logic control functions 92–95 are represented by respective lines 108–111. Safety directive inputs and safety status parameter inputs are initiated by the operator from the non-divisional controls of region 10 and, preferably, for achieving man-machine efficiencies, from the touch display 52. These initiated commands are then communicated from the local area network into non-divisional optically isolated communications lines 114–121. Lines 114–121 may be provided, for example, as fiber optic lines or, if conventional electrical type transmission components are utilized, then opto-isolators pairs are provided leading to each of the interface components 102–105 as represented, respectively, at 124–127. For each of the divisions, I–IV, the corresponding interface device 102–105 is operated with a safety qualified display and switch bank. These small displays and switches are shown in the drawing mounted within a safety qualified panel 132 and are represented at blocks 134–137 for respective divisions I–IV. Communications of a safety qualified caliber are provided for the display-switch functions 134–137 as represented by respective lines 140–143.

The safety qualified interface components 102–105 are employed to carry out what may be termed a software isolation function. Where the operator, preferably operating from a convenient console position as from touch display 52 seeks to carry out a safety directive, an appropriate input to the division selected is made, for example as represented through line 54 and microprocessor driven control function 56 to the local area network. The resultant safety directive input then is transmitted over an isolated communications link, for example as at 114–115 leading to the interface 102 of division I. A communications input function within interface device 102 receives the operator initiated safety directive input and develops a corresponding trial safety directive signal. This signal is maintained in a register and the control components of the interface device 102 then acesses a memory which contains a library collection of accessible predetermined valid safety directive inputs. It is only an input from this library which can be employed to carry out a safety control function. Thus, the trial safety directive input is compared with a corresponding valid safety directive input contained in memory and upon the occasion of correspondence therebetween, that valid safety directive drawn from memory is transmitted for division I through safety communications link 140 to the display as represented at block 134. The operator then has the opportunity to acknowledge the correctness of the selected safety directive input by actuating a switch or series of switches within the division and adjacent the display as represented at block 134. Upon appropriate acknowledgment, the interface as at 102 then responds to transmit only the valid safety directive input which was retrieved from memory from its output port via a safety communications linkage as represented for division I at line 96 for carrying out a predetermined function within the reactor facility 90. Thus, only a prequalified command retained in secure divisional memory may be used to carry out a safety related function.

The collection of data or operational parameters from the safety components of division is accomplished in somewhat the same manner. In this regard, the division retained memory further retains a library collection of valid safety status parameters. The interface responds to a parameter request from the operator, for example, from the more convenient man-machine interface as at touch display 52. The interface through a communications input develops a trial safety status parameter signal which is positioned in an appropriate register. The microprocessor-driven control of the interface then carries out a matching of the requested parameter with the memory retained safety status parameters. In the event of a match, the parameter can be retrieved or alternately, the earlier-discussed acknowledgment procedure may be carried out prior to retrieval of the parameter. In addition to parameter retrieval, the memory also may retain predetermined permissible deviation ranges from the current value displayed by the non-class 1E system. In this regard, it is desirable to alert the operator that the non-safety qualified parameter readouts are exhibiting inaccuracies beyond acceptable limits. An alarm for this condition forces the operator to take corrective action with respect to the non-safety readout equipment. Other safety system instrumentation is available for the case of a safety system parameter falling without an acceptable threshold level or deviation range. As such, a computation may be developed to provide an alarm output to the operator which is perceptible, for example, both visually and audibly in the presence of the operator. Acknowledgment from the divisional qualified components then is required of the operator.

Figure 2:
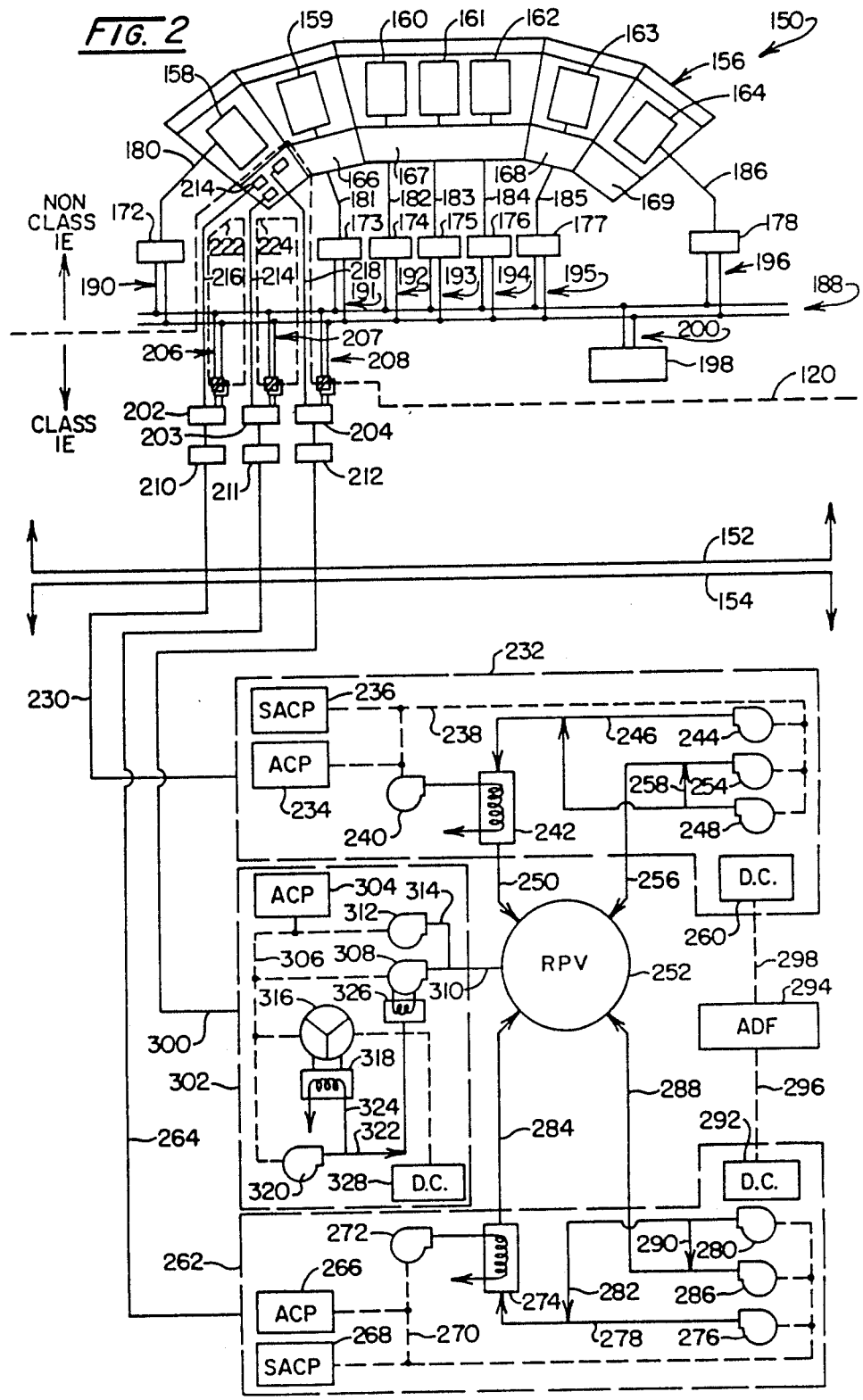
FIG. 2 is a block schematic diagram showing an operator manned control region, divisional interface and safety system logic and control functions as related to an emergency cooling system network for a nuclear reactor driven power system.

Referring to FIG. 2, an operator manual control region as at 10 again is represented in general at 150 in a schematic portrayal showing its functional relationship with three safety divisions as performing in conjunction with the emergency cooling system network for a typical reactor power system. Such manual control regions as at 150 conventionally are located within a separate control building as is schematically represented by separator line 152. Correspondingly, the reactor pressure vessel and associated control actuation components generally will be located in a separate reactor building as depicted by the separator line 154. As in FIG. 1, the manual control region 150 will include a generally centrally disposed console 156 which may incorporate a sequence of touch screen type displays for normal or non-class 1E operations as are represented at 158–164. Corresponding control panels are shown at 166–169 and microprocessor based local control components for these control features are represented at 172–178. These controls 172–178 are shown in communication with the control panels and displays via respective lines 180–186 and with a local area network represented generally at 188 via respective line pairs 190–196. A mainframe processor here represented at block 198 provides interactive control and communication with the local area network as represented at line pair 200.

Interface components for three divisions, I–III, are represented at 202–204, and these interface units are coupled for non-divisional communication through opto-isolated communications networks represented, respectively, at 206–208. Additionally as before, within each of the three divisions, a qualified safety system logic and control network is provided as represented at 210-212. Interface components 202-204 also are seen to be configured for safety qualified communications with a corresponding safety qualified switches and small displays generally represented at panel 214 at console 156 through qualified communications links represented at 216-218. The divisional separation or class 1E versus non-class 1E for the system can be represented by the dashed periphery 120 which is seen to incorporate the secure switches and displays at panel 214 as well as communication links 216-218 but not the local area network or isolated communications 206-208. The latter isolated non-class 1E links are further identified by the dashed boundary loops 222 and 224.

The safety qualified communications link whether electrical or fiber optic in nature for division I is shown extending from safety system logic and control block 210 at line 230 which, in turn, accesses the components of the emergency cooling network for division I within boundary 232. This exemplary division is seen to include a normal a.c. power supply (ACP) at block 234 as well as a stand-by a.c. power source (SACP) as represented at block 236. These power sources are shown directed to various components within division I by dashed line 238. Power distribution as represented by the latter line extends, for example, to a residual heat removal service water pump serving to circulate water through the coil of a residual heat removal heat exchanger represented at block 242. The exchanger 242, in turn, is seen to receive fluid from a low pressure coolant injection mode (RHR) pump 244 as represented by conduit line 246 as well as from a water leg pump 248, the output of which is shown at line 250 extending to conduit 246. Power output of heat exchanger 242 is shown to extend via conduit 250 to reactor pressure vessel (RPV) 252. A low pressure core spray pump is shown at 254 providing fluid input to the reactor vessel 252 via conduit 256, the latter conduit also may receive water from the pump 248 as represented by branch conduit 258. Finally, a plant d.c. power source represented at block 260 is seen to be located within the division I boundary.

Division II as represented by boundary 262 is shown controlled by communications link 264. Division II also is seen to incorporate a normal a.c. power source (ACP) represented at block 266 as well as a stand-by a.c. power source (SACP) as represented at block 268. A power distribution network extends from these power sources 266 and 268 as represented by dashed lines 270. As before, dashed line 270 extends to a residual heat removal service water pump 272 which provides coolant to a residual heat removal heat exchanger represented at block 274. Low pressure injection mode coolant is supplied to the exchanger 274 from pump 276, and as in the case with division I, a water leg pump 280 also may supply water to the exchanger 274 as represented by conduit 282. Fluids passing the exchanger 274 are directive to the reactor pressure vessel 252 via conduit 284. A low pressure core spray pump 286 supplies water to the reactor pressure vessel 252 via conduit 288. Fluid from the water leg pump 280 also may be supplied to the latter conduit via conduit line 290. As before, a d.c. power source is provided within division II as represented at block 292. Redundant d.c. power thus may be made available to an automatic depressurizer function represented at block 294 from d.c. source 292 as represented at dashed line 296 or from d.c. source 260 as represented at dashed line 298.

Division III is shown controlled from safety system logic and control network 212 as represented by communications link 300 extending to boundary 302. Division III is seen to include a normal a.c. power source (ACP) represented at block 304 which supplies a power network represented by dashed lines 306 to a high pressure core spray pump 308, the output of which is seen to be directive via conduit 310 to the reactor pressure vessel 252. A water leg pump 312 also is coupled to feed conduit 310 from conduit 314. A high pressure core spray diesel generator is represented at 316 which, in turn, is coupled with a heat exchanger represented at block 318 which receives coolant supplied from a service water pump 320, the output of which is represented at conduits 322 and 324. Conduit 322 is seen to extend to another heat exchanger 326 associated with pump 308. A d.c. power source is provided in the division as represented at block 328 which is operably associated with generator 316.

Figure 3:
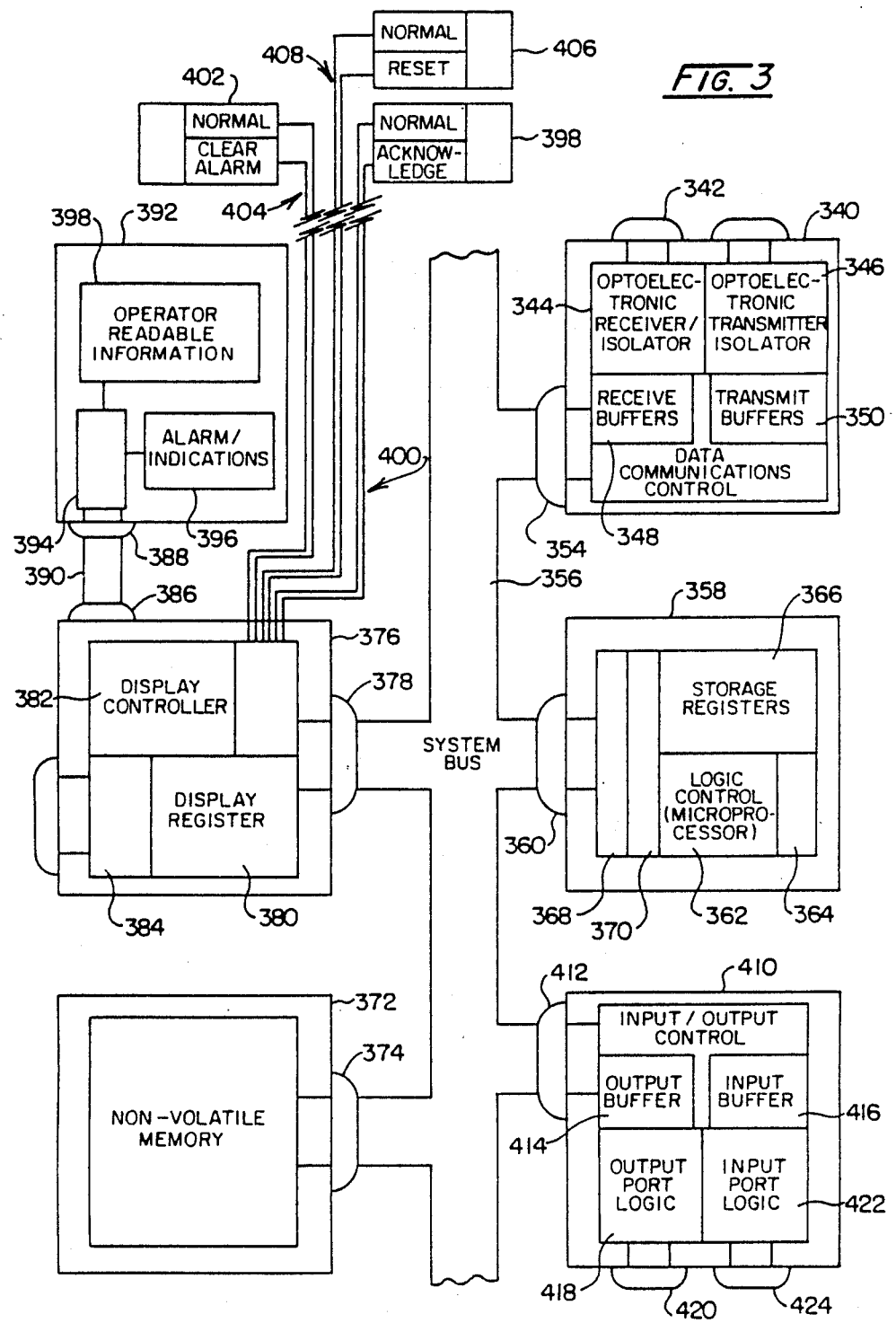
FIG. 3 is a schematic diagram of the interface apparatus utilized within the divisions of the arrangement described in conjunction with FIGS. 1 and 2.

Referring to FIG. 3, a divisional interface network is schematically portrayed. Each such divisionally situated network includes a communications input network represented generally at 340 which includes an input port 342 which is coupled to the non-qualified or non-safety input lines, for example as described at 114 in FIG. 1, and, in addition to providing an input port function may alternately incorporate opto-isolators to achieve the noted isolation. Alternately, transmission to port 342 may be via fiber optics in which case a conversion function occurs to provide a binary signal corresponding to the optical input which represents, in the case of control, a trial safety directive signal. The transmission to port 342 also will occur with conventional identifying delimiters and validity of transmission checks such as checksum techniques and the like. Where a request for parameter data is made to port 342, a similar corresponding trial safety status parameter signal is developed. The system also will retrieve a corresponding parameter value from the normal, non-safety readoiuts at the control region. This non-safety parameter value will be seen to be compared with a memory retained permissible deviation range to assure operator alertness to unacceptable discrepancies. The opto-electrical receiving and isolation function (ORI) is represented at block 344. In similar fashion, opto-electric transmission and corresponding conversion from digital electronics to optical format is provided by opto-electronic transmitter/isolator network (OTI) as represented at block 346. The communications network 340 also will include data communications control functions including receiving buffers as represented at block 348 and transmission buffers as represented at block 350. Communication of network 350 within the interface network itself is provided at port 354 which communicates with the system bus 356.

Principal control for the interface is provided by a microprocessor driven control function represented within block 358 which is seen to communicate with system bus 356 via port 360 and which includes a microprocessor control represented at block 362 which performs in conjunction with a system clock represented at block 364, storage registers represented at block 366, and system bus interface components 368 as well as logic 370. Control 358 performs in conjunction with a non-volatile memory represented at block 372 shown associated with the control 358 via bus connection 374 and system bus 356. The memory 372 retains a library collection of valid safety directive inputs as well as a collection of valid safety status parameter inputs along with the noted threshold or parameter deviation information. These data, which are carefully pre-selected and positioned within memory 372 are the trusted and valid data to be used in accessing and commanding the controls and monitors within that division associated with a given interface network. The control function 358 serves to evaluate the trial safety directive or safety parameter received at the communications function 340 and derive a matching valid directive or parameter from memory 372. Where a candidate directive or parameter is so selected, then, that parameter or directive from memory is transmitted by the control to a display controller represented at block 376. The controller 376 is operationally coupled with system bus 356 via port 378 and includes display registers as represented at block 380 and a display controller represented at block 382 which incorporates reset logic and appropriate signal retention components. Additionally, the controller may include voice actuation networks such as phoneme generators and the like as represented at block 384. The controller 382 functions to communicate as represented by ports 386, 388, and linkage 390 with a class 1E safety, secure display represented at block 392. The display available for the function of block 392 necessarily is smaller, in part to effectively accommodate the safety qualifications imposed upon such equipment providing, for example, seismic tolerance and the like. The function will include normal logic buffers as represented at block 394 dedicated alarm indicators as represented at block 396, and an operator readable display which may, for example, be of a CRT, electroluminescent, plasma, or segmented display as represented at block 398. Additionally driven from the display controller 382 are class 1E qualified operator actuable switches. In this regard, an acknowledge switch is represented at block 398 as being associated in secure fashion with display controller 382 via line pair 400. This switch is actuated by the operator to acknowledge a correct selection of safety directive signal or safety parameter otherwise displayed at display 398. A switch is shown having a normal orientation as well as an acknowledge orientation. Additionally, where alarm data are transmitted through the system, a switch represented at block 402 provides for an alarm clear. The switch is shown communicating with the display controller function 382 via line pair 404 and is shown having a normal orientation as well as an alarm clear orientation. Finally, a reset switch is represented at block 406. This class 1E qualified device provides for resetting the system, for example, to clear a previous command, and, as before, includes a reset orientation as well as a normal or stand-by orientation and is coupled by additional or qualified line pair 408 with the display controller function 382. The display 392 as well as switch functions 398, 406, and 402 are contained within the additional control block 132 as described in conjunction with FIG. 1 or as at 214 in FIG. 2. While remaining within the divisional safety system, the switches and small displays are physically associated in close proximity with the nominal operational controls of the system, for example the touch display 52 of console 12(FIG. 1) or touch display 158 of console 156(FIG. 2).

Communication with the safety system components via the safety system logic control networks as described in FIG. 1 at 92–95 and in FIG. 2 at 210–212 is provided by an input/output control function represented at block 410. The network 410 includes an input/output connection 412 with the system bus 356 and, in conventional fashion, includes input and output buffers as shown respectively at 414 and 416 as well as output port logic represented at block 418 and communicating with output port 420 as well as input port logic 422 communicating with the safety system logic and control networks via port 424.

Figure 4:
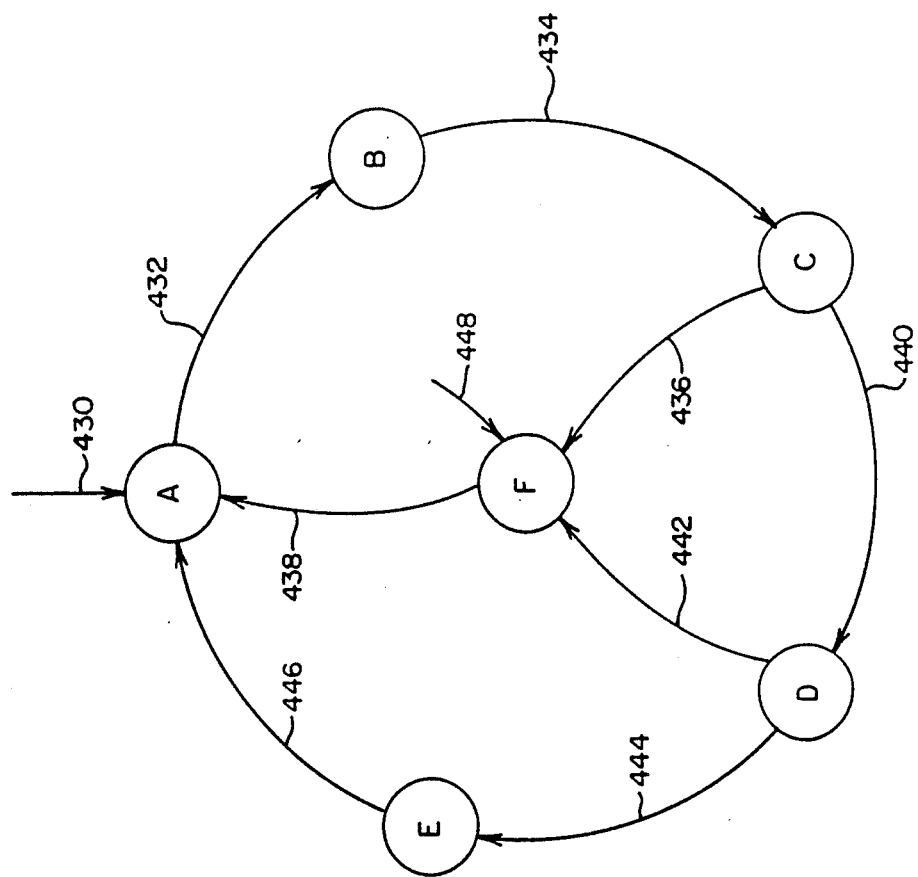
FIG. 4 is a state logic diagram illustrating the safety directive response of the interface of FIG. 3.

Looking to FIG. 4, a state diagrammatic representation of the operation of the system of the invention in carrying out safety system control is revealed. Node A and line 430 represent that, upon power-on or reset, the system awaits an operator initiated safety directive input. Upon receipt of such input, then as represented by line 432, the safety directive input is evaluated and stored in a register as a trial safety directive signal as now represented at node B. The diagram then continues as represented at line 434 to node C wherein the process of accessing memory for a corresponding valid safety directive input in carrying out a matching procedure ensues. In the event that a match is not found, then as represented at line 436 and node F, an alarm is activated and the cause of the alarm, i.e. a failure to find a match with the trial safety directive signal is provided as at the display 398 described in conjunction with FIG. 3. The operator then may clear the alarm by actuation of switch 402 as represented at line 438 and the state diagram returns to node A.

Where a match of the trial safety directive signal and the memory retained valid safety directive input is developed, as represented at line 440 and node D, the valid safety directive is displayed at the secure display 398 (FIG. 3) and the system awaits an operator acknowledgment, for example, from corresponding safety qualified switch 398. A predetermined interval is provided for this acknowledgment and, upon the time-out of the interval, as represented at line 442, the system reverts to node F and a form of perceptible indication of such time-out is displayed until such time as a reset or alarm querry occurs. The system then reverts to node A as represented at line 438. In the event an acknowledgment is received as to a displayed valid safety directive, then as represented at line 444 and node E, the valid safety directive is transmitted from the output port of the system, i.e. from the input/output function as described at block 410 and output 420 in FIG. 3. As represented at line 446, the system then reverts to node A.

Because a variety of operator mistakes necessarily must be anticipated in any form of safety system, for example the assertion of commands while the system is at node D of the state diagram of other illegal commands, then a form of prohibited event and/or self-diagnostic control is required. This prohibited event aspect of the system is represented at open line 448 leading to node F permitting a reset or start-over again function as represented by line 438.

Figure 5:
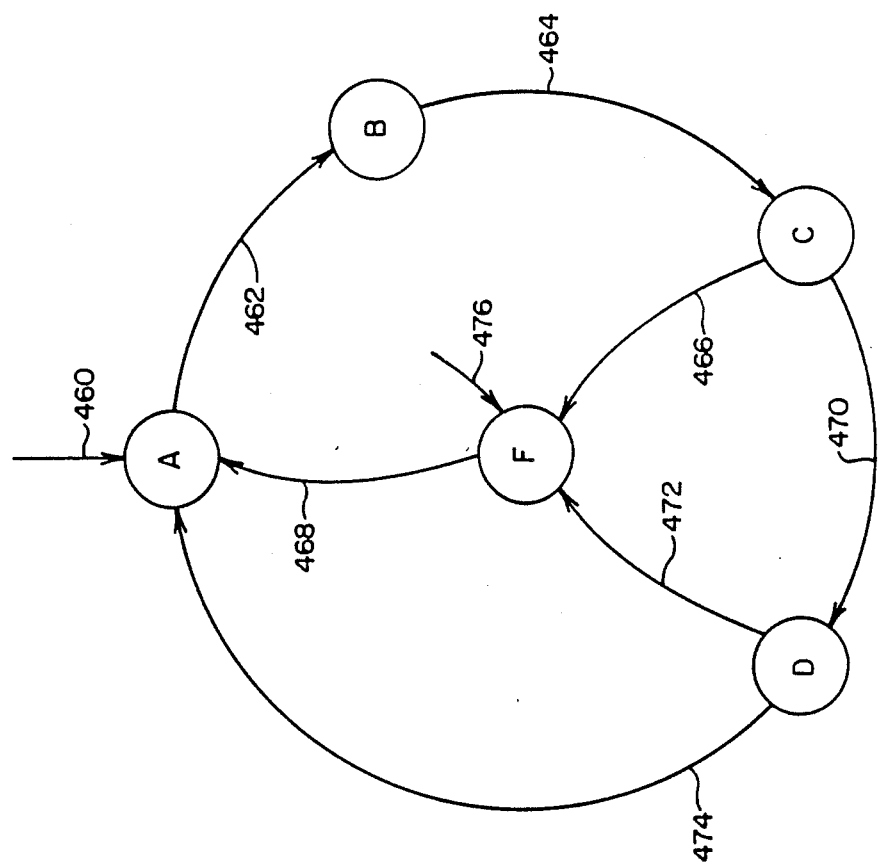
FIG. 5 is a logic state diagram illustrating the performance of the interface apparatus of FIG. 3 responding to safety status parameter inputs.

Turning to FIG. 5, a similar state diagram is provided which looks to the request for and verification of safety system parameters on the part of the operator. The state diagram commences with power-on/reset conditions as represented at line 460 and node A. At this position, the system awaits an operator initiated safety status parameter input and upon a reception of that input, as represented at line 462 and node B, the safety status parameter input is read and stored in an appropriate register as a trial safety status parameter signal. The state diagram then progresses as represented at line 464 to node C wherein the memory, i.e. memory 372 as described in conjunction with FIG. 3, is accessed to find a valid safety status parameter matching the trial safety status parameter signal. Where no match is found, then as represented at line 466 and node F, an indication is made to the operator that a mismatch is at hand. The operator may then reset the system or appropriately clear it as represented at line 468 and the system reverts to node A of the state diagram. Where a match is found in conjunction with the activity represented at node C, then as represented at line 470 and node D, the system retrieves the valid safety status parameter value along with a permissible deviation range from the current value displayed by the non-Class 1E system. Where the retrieved non-safety parameter value does not fall within the permissible deviation, then as represented at line 472, the system reverts to node F wherein an alarm is activated and information is provided to the operator within the qualified display system. Upon an alarm clear acknowledgment by the operator or an appropriate reset, the system reverts to node A as represented at line 468.

Where the valid safety status parameter and permissible deviation therefrom which have been retrieved are evaluated with respect to the non-safety or non-Class 1E parameter readout and the letter value is within the permissible deviation range, then as represented at line 474, the system reverts to node A. As before, the system also must accommodate for the occurrence of a prohibited event such as an illegal command on the part of the operator in terms of retrieving safety parameter information. The self-diagnostic procedure also may be required and this function of the system is represented at line 476 leading to node F.

Since certain changes may be made in the above-described apparatus, system, and method without departing from the scope of the invention herein involved, it is intended that all matter contained in the description thereof or shown in the accompanying drawings shall be interpreted as illustrative and not in a limiting sense.

I claim:

1. In a nuclear power plant installation of a variety having a controllable nuclear reactor, normal operational control means having monitor outputs and responsive to control inputs for effecting nominal mode control over said reactor, divisional operational control means including at least two independent divisions having qualified safety system logic monitoring and control devices for providing safety status parameter outputs and responsive to select safety directive inputs for providing safety mode control over said reactor, an operator manned control region including a console having an operator interface for the assertion of said control inputs and initiation of said safety directive inputs, the improved control method comprising the steps of:

providing a display at said console responsive to display inputs to generate operator readable information;

providing an interface network within each said division having a communications link input means for receiving said operator initiated safety directive inputs in binary format, a non-volatile memory, a display controller, input and output ports, and a logic control means for controlling said memory, display controller, communication link input means and said input and output ports;

providing isolated communications link means between said link input means and said operator interface for transmitting said initiated safety directive inputs to said communications link input means;

providing a directive communications link between said output port and said safety system logic, monitoring, and control devices;

providing a library collection of accessable predetermined valid said safety directive inputs in binary format within said memory;

responding with said logic control means to a said received operator initiated safety directive input by accessing said memory for a corresponding said valid said safety directive;

effecting transmission of said accessed valid safety directive by said logic control means and said display controller to said display to generate operator readable information descriptive thereof; and effecting transmission by said logic control means of only said accessed valid safety directive from said output port through said directive communications link to said safety system control devices.

2. The method of claim 1 including the steps of:

providing an operator actuable acknowledge input means in the vicinity of said display for generating an operator acknowledgment signal representing the correctness of said readable information at said display; and effecting said logic control means transmission of said accessed valid safety directive from said output port only in response to said operator acknowledgment signal.

3. The method of claim 1 including the steps of:

providing a discrete, dedicated input storage register with said interface network;

effecting said response with said logic control means by loading said received operator initiated safety directive input into said input storage register, and determining the presence of a match of said loaded input with said accessed memory retained valid safety directives;

effecting said logic control means transmission of said accessed valid safety directive resulting from a said match to said display to generate said readable information; and effecting said logic control means transmission of said accessed valid safety directive, only resulting from a said match, from said output port through said directive communications link.

4. The method of claim 3 including the steps of:

providing an operator actuable acknowledge input means in the vicinity of said display for generating an operator acknowledgment signal representing the correctness of said readable information at said display; and effecting said logic control means transmission of said accessed valid safety directive from said output port only in in response to said operator acknowledgment signal.

5. The method of claim 3 including the steps of:

providing a parameter communications link between said input port and said safety systems monitoring devices;

providing a collection of accessable predetermined valid said safety status parameter designations in binary format within said memory;

responding with said logic control means to a received operator initiated input representing a request for the value of a said safety status parameter by accessing said memory for a corresponding valid said safety status parameter designation;

effecting retrieval of the value of a said safety status parameter corresponding with said accessed valid safety status parameter designation into said input port; and effecting transmission of said retrieved value of said safety status parameter by said logic control means to said display to provide operator readable information corresponding therewith.

6. The method of claim 5 including the steps of:

providing an operator actuable acknowledge input means in the vicinity of said display for generating an operator acknowledgment signal representing the correctness of said readable information at said display; and effecting said logic control means transmission of said accessed valid safety directive from said output port only in response to said operator acknowledgment signal.

7. The method of claim 1 including the steps of:

providing a parameter communications link between said input port and said safety systems monitoring devices;

providing a collection of accessable predetermined valid said safety status parameter designations in binary format within said memory;

responding with said logic control means to a received operator initiated input representing a request for the value of a said safety status parameter by accessing said memory for a corresponding valid said safety status parameter designation;

effecting retrieval of the value of a said safety status parameter corresponding with said accessed valid safety status parameter designation into said input port; and effecting transmission of said retrieved value of said safety status parameter by said logic control means to said display to provide operator readable information corresponding therewith.

8. In a nuclear power plant installation of a variety having a controllable nuclear reactor, normal operational control means having parameter monitor outputs and responsive to control inputs for effecting nominal mode control over said reactor, divisional operational control means including at least two independent divisions having qualified safety system logic, monitoring and control devices for providing safety status parameter outputs and responsive to select safety directive inputs for providing safety mode control over said reactor, and an operator manned control region including a control position having an operator interface for the assertion of said control inputs, the intiation of said safety directive inputs and initiation of safety status parameter inputs, the improved control system, comprising:

display means located at said control position, responsive to display inputs for deriving operator readable information;

isolated communication link means for providing electrically isolated communication of said initiated safety directive inputs from said operator interface to each said division;

communications input means within each said division for receiving said initiated safety directive inputs and providing corresponding trial safety directive signals;

memory means within each said division for retaining a library collection of accessible predetermined valid said safety directive inputs;

register means within each said division for retaining said received trial safety directive signals;

display controller means within each said division for deriving said display inputs in response to information inputs transferred thereto;

input and output port means within each said division for effecting control and monitoring communication with said safety system logic, monitoring and control devices;

control means within each said division responsive to said communications input means for locating said trial safety directive signal at said register means, responsive to access said memory means library collection to retrieve a said valid safety directive input corresponding with said register means retained trial safety directive, responsive to effect transmission only of said retrieved valid safety directive input from said output port means to effect said safety mode control over said reactor.

9. The control system of claim 8 in which said control means is responsive to transfer said retrieved valid safety directive input as a said information input to said display controller means for deriving said display inputs in correspondence therewith.

10. The control system of claim 8 including:

acknowledge input means within each said division, located at said control position, manually actuable by said operator for conveying an acknowledge signal to said control means representing the correctness of said operator readable information;

said control means is responsive to transfer said retrieved valid safety directive input as a said information input to said display controller means for deriving said display inputs in correspondence therewith to provide said operator readable information, and is responsive to effect said transmission only of said retrieved valid safety directive input from said output port means only subsequent to said conveyance of said acknowledge signal.

11. The control system of claim 8 in which:

said memory means further retains a library collection of accessible predetermined valid said safety status parameter inputs;

said isolated communications link means is responsive to said initiated safety status parameter inputs from said operator interface for effecting the conveyance thereof to said communications input means;

said communications input means is responsive to said conveyed initiated safety status parameter inputs for providing corresponding trial safety status parameter signals;

said register means is configured for retaining said trial safety status parameter signals;

said control means is responsive to said communications input means for locating said trial safety status parameter signals at said register means, is responsive to access said memory means library collection to retrieve a said predetermined valid safety status parameter input corresponding with said register means retained trial safety status parameter signal, is responsive to effect transmission only of said retrieved valid safety status parameter input from said output port means to a corresponding said safety system monitoring device and retrieve therefrom a corresponding said safety status parameter output at said input port means, is responsive to convey said retrieved safety status parameter output from said input port means as a said information input to said display controller means for deriving said display inputs in correspondence therewith.

12. The control system of claim 11 in which:

said display means includes alarm means responsive to a select said display input for providing an alarm output perceptible to said operator;

said memory means retains a collection of accessible predetermined permissible deviation ranges corresponding with select said retained valid safety status parameter inputs; and said control means is responsive to compare a said permissible deviation range corresponding with the value of a said retrieved safety status output with the value of a corresponding said parameter monitor output of said normal operational control means and derive an alarm designated said information input when said parameter output value is without said permissible deviation range, is responsive to transfer said alarm designated information input to said display controller means for deriving said select display input so as to provide said alarm output at said display means.

13. The control system of claim 12 including:

acknowledge input means within each said division located at said control position, manually actuable by said operator for conveying an alarm acknowledge signal to said control means representing an acknowledgment of said alarm output; and said control means is responsive to said alarm acknowledge signal for terminating said alarm designated information input.

14. In a nuclear power plant installation of a variety having a controllable nuclear reactor, normal operational control means having parameter monitor outputs and responsive to control inputs for effecting nominal mode control over said reactor, divisional operational control means including at least two independent divisions having qualified safety system logic, monitoring and control devices for providing safety status parameter outputs and responsive to select safety directive inputs for providing safety mode control over said reactor, and an operator manned control region including a control position having an operator interface for the assertion of said control inputs, the initiation of said safety directive inputs and initiation of safety status parameter inputs, said safety directive inputs and said safety status parameter inputs being transmissible over an optical isolation communications link within each said division, and said operator interface including a display providing visual readouts to said operator in response to display inputs, and each said division including a manually actuable operator acknowledge device at said control position, the division safety system interface apparatus comprising:

communications input means for receiving said initiated safety directive inputs and providing corresponding trial safety directive signals;

first register means controllable to selectively retain said received trial safety directive signals;

memory means for retaining a compilation of accessible valid said safety directive inputs;

input and output port means for effecting communications with said safety system logic, monitoring and control devices; and control means responsive to said communications input means for locating said trial safety directive signals at said first register means, responsive to access said memory means compilation to retrieve a said valid safety directive input corresponding with said register means retained trial safety directive signal, responsive to effect transmission only of said retrieved valid safety directive input from said output port means to effect said safety mode control over said reactor.

15. The division safety system interface apparatus of claim 14 including:

display controller means for deriving said display inputs in response to information inputs transferred thereto;

second register means controllable to selectively retain a said retrieved valid safety directive; and said control means is responsive to transfer said retrieved valid safety directive to effect the positioning thereof in said second register means, responsive to transfer said retrieved valid safety directive from said second register means to said display controller means as a said information input for deriving said display inputs.

16. The division safety system interface apparatus of claim 14 including:

display controller means for deriving said display inputs in response to information inputs transferred thereto; and second register means controllable to selectively retain a said retrieved valid safety directive;

said control means is responsive to transfer said retrieved valid safety directive to effect the positioning thereof in said second register means, responsive to transfer said retrieved valid safety directive from said second register means to said display controller means as a said information input, and is responsive to effect said transmission only of said retrieved valid safety directive input from said output port means only subsequent to the said actuation of said operator acknowledge device by said operator.

17. The division safety system interface of claim 14 in which:

said communication input means effects reception of said initiated safety status parameter inputs and provides corresponding trial safety status parameter signals;

including third register means controllable to retain said trial safety status parameter signals;

display controller means for deriving said display inputs in response to information inputs transferred thereto;

said memory means further retains a compilation of accessible valid said safety status parameter inputs; and said control means is responsive to said communications input means for locating said trial safety status parameter signals at said third register means, is responsive to access said memory means compilation to retrieve a said valid safety status parameter input corresponding with said third register means retained trial safety status parameter signal, is responsive to effect transmission only of said retrieved valid safety status parameter input from said output port means to a corresponding said safety system monitoring device and to retrieve therefrom a corresponding said safety status parameter output at said input port means, and is responsive to convey said retrieved safety status parameter output from said input port means to said display controller means for deriving said display inputs in correspondence therewith.

18. The division safety system interface of claim 17 including:
fourth register means controllable to selectively retain said retrieved safety status parameter output; and
said control means is responsive to transfer said safety status parameter output from said input port to said fourth register means, and subsequently to effect conveyance of said safety status parameter from said fourth register means to said display controller means to effect said derivation of said display inputs in correspondence therewith.

19. The division safety system interface of claim 18 in which:
said communications input means effects reception of said parameter monitor outputs of said normal operational control means corresponding with a said initiated safety status parameter inputs;
including fifth register means controllable to retain a select said parameter monitor output of said normal operational control means;
sixth register means controllable to retain parameter deviation range signals;
said memory means retains a compilation of accessible permissible parameter output deviation ranges corresponding with select said retrieved valid safety status outputs; and
said control means is responsive to said communications input means for locating a said parameter monitor output corresponding with a said trial safety status parameter signal at said fifth register means; is responsive to access said memory means compilation to retrieve a said parameter output deviation range corresponding with said valid safety status parameter input transferred to said fourth register means and effect transfer of said retrieved parameter output deviation range to said sixth register means; is responsive to said fifth and sixth register to derive an alarm parameter deviation signal when the value of said parameter monitor output at said fifth register is without said permissible parameter output deviation range at said register means, and is subsequently responsive to effect conveyance of said alarm parameter deviation signal to said display controller means or a said information input to effect deviation of said display inputs as an alarm signal.

20. In a nuclear power plant installation of a variety having a controllable nuclear reactor, normal operational control means having parameter monitor outputs and responsive to control inputs for effecting nominal mode control over said reactor, divisional operational control means including at least two independent divisions having qualified safety system logic, monitoring and control devices for providing safety status parameter outputs, and an operator manned control region including a control position having an operator interface for the assertion of said control inputs and the initiation of safety status parameter inputs, the improved control system comprising:
display means located at said control position, responsive to display inputs for deriving operator readable information;
isolated communications link means for providing electrically isolated communication of said initiated safety status parameter inputs from said operator interface to each said division;
communications input means within each said division for receiving said intiated safety status parameter inputs and providing corresponding trial safety status parameter signals;
memory means within each division for retaining a library collection of accessible predetermined valid said safety status parameter inputs;
register means within each said division for retaining said trial safety status parameter signals;
display controller means within each said division for deriving said display inputs in response to information inputs transferred thereto;
input and output port means within each said division for effecting control and monitoring communication with said safety system logic, monitoring and control devices;
control means within each said division responsive to said communications input means for locating said trial safety status parameter signals at said register means, responsive to access said memory means library collection to retrieve a said predetermined valid safety status parameter input corresponding with said register means retained trial safety status parameter signal, responsive to effect transmission only of said retrieved valid safety status parameter input from said output port means to a corresponding said safety system monitoring device and retrieve therefrom a corresponding said safety status parameter output at said output port means, responsive to convey said retrieved safety status parameter output from said input port means as a said information input to said display controller means for deriving said display inputs in correspondence therewith.

21. The control system of claim 20 in which:
said display means includes alarm means responsive to a select said display input for providing an alarm output perceptible to said operator;
said memory means retains a collection of accessible predetermined permissible deviation ranges for said parameter monitor outputs of said normal operational control means corresponding with select said retained valid safety status parameter inputs; and
said control means is responsive to compare a said permissible deviation range corresponding with the value of a said retrieved safety status output with the value of a corresponding parameter monitor output and derive an alarm designated said information input when said value of said compared monitor output is without said permissible deviation range, is responsive to transfer said alarm designated information input to said display controller means for deriving said select display input so as to provide said alarm output at said display means.

22. The control system of claim 20 including:
acknowledge input means within each said division located at said control position, manually actuable by said operator for conveying an alarm acknowledge signal to said control means representing an acknowledgment of said alarm output; and
said control means is responsive to said alarm acknowledge signal for terminating said alarm designated information input.

* * * * *